United States Patent
Naylor et al.

(10) Patent No.: US 10,813,277 B2
(45) Date of Patent: Oct. 27, 2020

(54) RESILIENT MOUNTING OF A DOUBLE-SHOOT KNIFE IN A SINGLE-PASS, DOUBLE-SHOOT PLANTING UNIT FOR AN AGRICULTURAL IMPLEMENT

(71) Applicant: CNH Industrial Canada, Ltd., Saskatoon (CA)

(72) Inventors: Matthew S. Naylor, Saskatoon (CA); Robin B. Schilling, Darfield (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 188 days.

(21) Appl. No.: 16/045,110

(22) Filed: Jul. 25, 2018

(65) Prior Publication Data

US 2020/0029493 A1    Jan. 30, 2020

(51) Int. Cl.
| | |
|---|---|
| A01C 7/20 | (2006.01) |
| A01C 7/06 | (2006.01) |
| A01B 49/06 | (2006.01) |
| A01C 5/06 | (2006.01) |

(52) U.S. Cl.
CPC .............. *A01C 7/203* (2013.01); *A01B 49/06* (2013.01); *A01C 5/064* (2013.01); *A01C 7/06* (2013.01)

(58) Field of Classification Search
CPC ........... A01C 7/203; A01C 7/201; A01C 7/20; A01C 7/00; A01C 5/064; A01C 5/062; A01C 5/06; A01C 5/00; A01C 7/06
See application file for complete search history.

(56) References Cited

U.S. PATENT DOCUMENTS

| | | |
|---|---|---|
| 4,448,259 A | 5/1984 | Ford et al. |
| 4,932,475 A | 6/1990 | Homan |
| 6,158,523 A | 12/2000 | Gengler et al. |
| 6,237,696 B1 | 5/2001 | Mayerle |
| 7,131,501 B1 | 11/2006 | Svendsen et al. |
| 7,308,859 B2 | 12/2007 | Wendte et al. |
| 7,814,847 B2 | 10/2010 | Schilling et al. |
| 7,837,169 B2 | 11/2010 | Denis |
| 8,015,933 B2 | 9/2011 | Schilling et al. |
| 8,215,247 B2 | 7/2012 | Schilling et al. |
| 8,272,339 B2 | 9/2012 | Schilling et al. |

(Continued)

FOREIGN PATENT DOCUMENTS

EP          0 540 995 A1    5/1993

*Primary Examiner* — Christopher J. Novosad
(74) *Attorney, Agent, or Firm* — Rebecca L. Henkel; Rickard K. DeMille (57) ABSTRACT

An apparatus and method for depositing fertilizer and seed in a single-pass, double-shoot manner utilize a planting unit that includes a frame, a disk arrangement, first and second product delivery arrangements and a resilient mounting arrangement for attaching the second product delivery arrangement to the frame. The rotating disk cuts a furrow in a planting surface for receiving a first agricultural product such as fertilizer from the first product delivery arrangement. The second product delivery arrangement has a cutting edge that cuts a vertically and horizontally offset trench in a side wall of the furrow for receiving a second agricultural product such as seed. The resilient mounting arrangement provides limited resilient movement about a neutral position of the second product delivery arrangement under action of the soil on the second product delivery arrangement.

20 Claims, 9 Drawing Sheets

(56) References Cited

U.S. PATENT DOCUMENTS

| | | |
|---|---|---|
| 8,365,837 B2 | 2/2013 | Gray et al. |
| 8,448,586 B2 | 5/2013 | Schilling et al. |
| 8,646,395 B2 | 2/2014 | Schilling et al. |
| 9,313,937 B2 | 4/2016 | Gray et al. |
| 9,500,246 B2 | 11/2016 | Nielsen |
| 2011/0232552 A1* | 9/2011 | Schilling ................ A01C 5/064 111/154 |
| 2013/0269960 A1 | 10/2013 | Baker |
| 2013/0319702 A1 | 12/2013 | Baker et al. |
| 2017/0215334 A1 | 8/2017 | Dienst et al. |
| 2017/0280616 A1 | 10/2017 | Gervais et al. |

\* cited by examiner

RESILIENT MOUNTING OF A DOUBLE-SHOOT KNIFE IN A SINGLE-PASS, DOUBLE-SHOOT PLANTING UNIT FOR AN AGRICULTURAL IMPLEMENT

FIELD OF THE INVENTION

The present invention relates to agricultural implements and, more specifically, to a planting unit that provides double-shoot, single pass deposition of combinations of agricultural products, such as seed and/or fertilizer into a planting surface with horizontal and/or vertical stratification.

BACKGROUND OF THE INVENTION

Fertilizer and seed are generally deposited into furrows in a planting surface in either a single shoot or double shoot manner. With a single shoot planting technique, a combination of seed and/or fertilizer is deposited into a single furrow and subsequently packed. With a double shoot planting technique, a combination of seed and/or fertilizer are deposited into separate locations within the same furrow, and then packed.

While single shoot planting units are less complex, it is generally preferred to use a double shoot planting unit which allows seed and fertilizer to be separately deposited into the furrow. When the fertilizer and seed are mixed, reduced concentrations of fertilizer must be used to prevent the seed from becoming damaged, i.e., "burnt".

Where a cover crop is planted between the rows of a primary crop, a double-shoot planting process may also be desirable to provide for separately placing the seeds for the primary and cover crop in a horizontally and vertically stratified manner. Horizontal stratification keeps the rows of cover crop separated from the primary crop, and vertical stratification allows for different planting depths of the cover and primary crops.

In one exemplary double shoot planting unit, a knife has a side tip (side bander) that trails a rotating disk coulter as the planting unit moves along the planting surface. The disk creates a furrow having a bottom and sidewalls, and the knife creates a second furrow or trench in the sidewall of the furrow to effectively form separate trenches for the fertilizer and seed. The fertilizer and seed trenches are typically separated from one another both horizontally and vertically. This separation provides a fertilizer/seed stratification that has been found to provide better growing conditions, i.e., higher concentrations of fertilizer may be used without seed "burning".

Although such double-shoot planting units generally work well, experience has shown that operational life, efficiency and effectiveness of the knife can be diminished by the impact of obstructions such as rocks or trash, and other forces exerted on the knife as it is drawn through the soil. It is desirable, therefore, to provide improvements that address these issues.

SUMMARY OF THE INVENTION

The invention provides an apparatus and a method for depositing two agricultural products, such as fertilizer and seed in a single pass, double-shoot manner by utilizing a planting unit that includes a frame, a disk arrangement, first and second product delivery arrangements and a resilient mounting arrangement for attaching the second product delivery arrangement to the frame. The rotating disk cuts a furrow in a planting surface for receiving a first agricultural product from the first product delivery arrangement. The second product delivery arrangement has a cutting edge that cuts a vertically and horizontally offset trench in a side wall of the furrow for receiving a second agricultural product. The resilient mounting arrangement provides limited resilient movement about a neutral position of the second product delivery arrangement under action of the soil on the second product delivery arrangement, to thereby provide desirable improvements over prior planting units having rigidly mounted second product delivery arrangements.

In one form of the invention, a planting unit is provided for delivering a first and a second agricultural product using an agricultural implement. The planting unit includes a frame, a disk arrangement, first and second product delivery arrangements and a resilient mounting arrangement for attaching the second product delivery arrangement to the frame.

The frame is adapted for attachment to the agricultural implement and defines mutually perpendicular vertical and horizontal reference planes of the planting unit. The disk arrangement may be rotatably connected to the frame and configured for cutting a furrow into soil in such a manner that the furrow defines a bottom and a sidewall of the furrow. The first product delivery arrangement may be attached to the frame adjacent the disk and be configured for delivery of the first agricultural product to the furrow.

The second product delivery arrangement may include a cutting member configured for cutting a trench into the sidewall of the furrow above the bottom of the furrow. The second product delivery arrangement may be configured for delivery of the second agricultural product to the trench in the sidewall of the furrow.

The second product delivery arrangement is resiliently attached to the frame at a neutral position of the product delivery arrangement relative to the frame and the disk arrangement by the resilient mounting arrangement. The resilient mounting arrangement is operatively disposed between the frame and the second product delivery arrangement and configured for providing limited resilient movement of the second product delivery arrangement from the neutral position under action of the soil on the second product delivery arrangement.

The trench may be cut horizontally and vertically offset from the bottom of the furrow, in some forms of the invention.

In some forms of the invention, the second product delivery arrangement may be operatively connected to the frame by an adjustable mounting arrangement having at least two user selectable positions for vertically adjusting the neutral position of the second product delivery arrangement with respect to the disk.

The frame may include a receptacle for receiving a portion of the resilient mounting arrangement. The resilient mounting arrangement may include a resilient element disposed at least partly in the receptacle in the frame, and a clamping arrangement for resiliently clamping the resilient element between the second product delivery arrangement and the frame.

In some forms of the invention, the receptacle in the frame defines an aperture extending generally horizontally into the frame and configured for receiving the resilient element, the resilient element is configured for being retained within the aperture by the clamping arrangement, and the clamping arrangement includes at least one fastener passing through the resilient element and providing clamping engagement of the resilient element between the frame and the second product delivery arrangement.

The aperture for receiving the resilient element may extend generally horizontally through the frame from a first to a second side of the frame. The resilient element may include a first resilient member configured for extending into the aperture from the first side of the frame and having a lip configured for bearing against the first side of the frame, and a second resilient member configured for extending into the aperture from the second side of the frame and having a lip configured for bearing against the second side of the frame. The clamping arrangement may include first and second resilient mount clamping members and a resilient mount clamping fastener, with the first and second resilient mount clamping members being configured for respectively operatively engaging the lips of the first and second resilient members, and the mount clamping fastener, resilient members. The mount clamping members may be configured for passage of the mount clamping fastener through the resilient members and mount clamping members and for providing clamping engagement of the resilient members within the aperture in the frame by the mount clamping members. The clamping arrangement may further include at least one second product delivery arrangement fastener configured for passing through the resilient members and mount clamping members for clamping and securing the second product delivery arrangement in the neutral position against one of the clamping members.

The invention may also take the form of an agricultural implement including at least one planting unit according to the invention. The invention may further take the form of a method for resiliently mounting a second product delivery arrangement in accordance with the invention.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings, in the drawings.

DETAILED DESCRIPTION OF THE INVENTION

Figure 1:
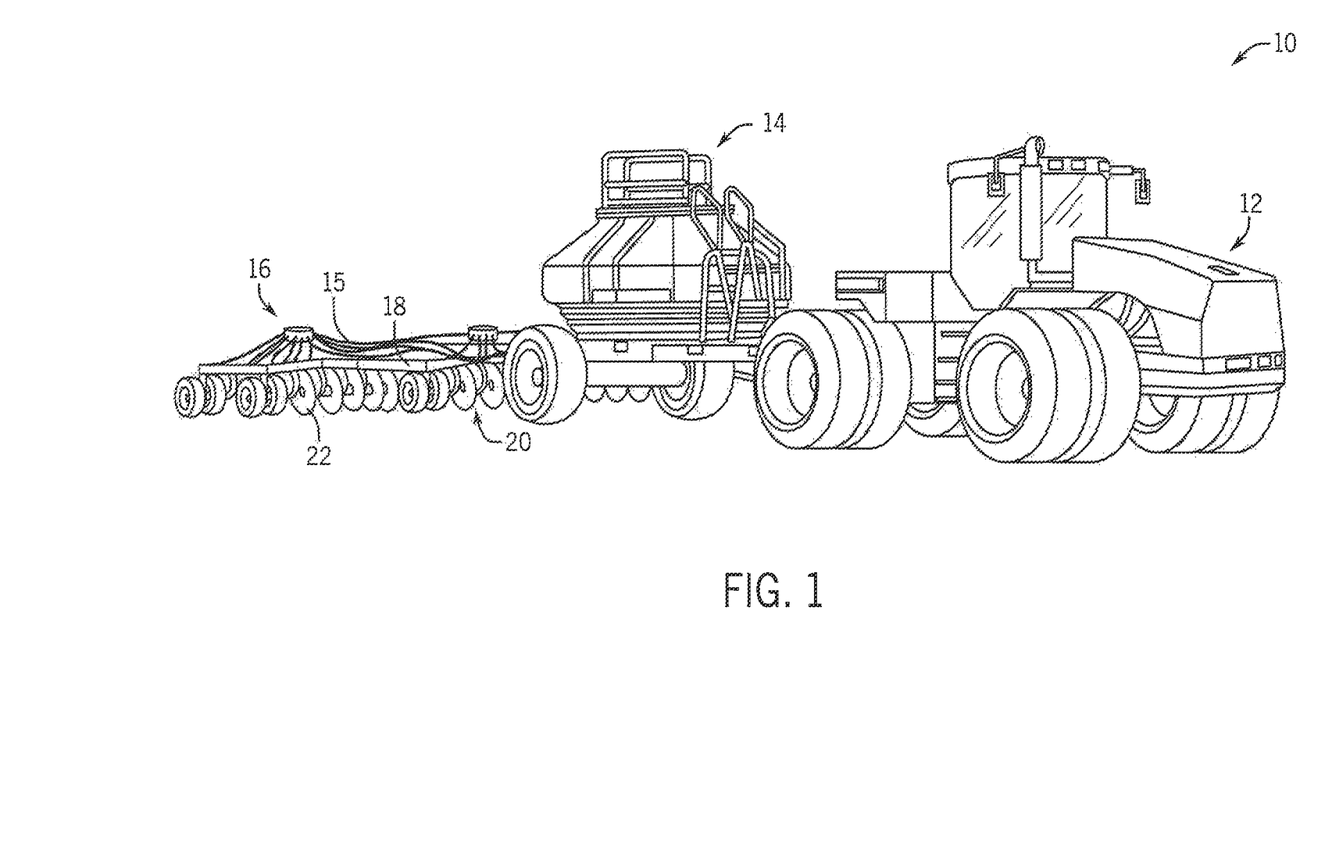
FIG. 1 illustrates a isometric view of an exemplary embodiment of an agricultural planting system, comprising a seeding system that incorporates single-pass, double-shoot planting units that include a frame, a disk arrangement, first and second product delivery arrangements and a resilient mounting arrangement for attaching the second product delivery arrangement to the frame, in accordance with an exemplary embodiment of the present invention.

FIG. 1 shows an exemplary embodiment of an agricultural implement, according to the invention, in the form of a seeding system 10 configured to be pulled by a tractor 12. The seeding system 10 is generally comprised of an air cart 14, and a seeder 16. The air cart 14 and the planter 16 are coupled to the tractor 12 in a conventional manner. The seeder 16 includes a tool bar 18 to which a set of planting units 20 are coupled. The planting units 20 each include a disk 22 designed to cut a furrow into the surface of the soil. The air cart 14 pneumatically delivers seed and/or fertilizer to the planter units 20 through a set of delivery tubes 15 of the seeder 14 for deposition into the soil.

In a manner described below, the planting units 20 in the exemplary embodiment are each configured for separately depositing seed and fertilizer in the furrow in a single-pass, double-shoot manner that provides horizontal and vertical stratification between the seed and the fertilizer.

Figure 2:
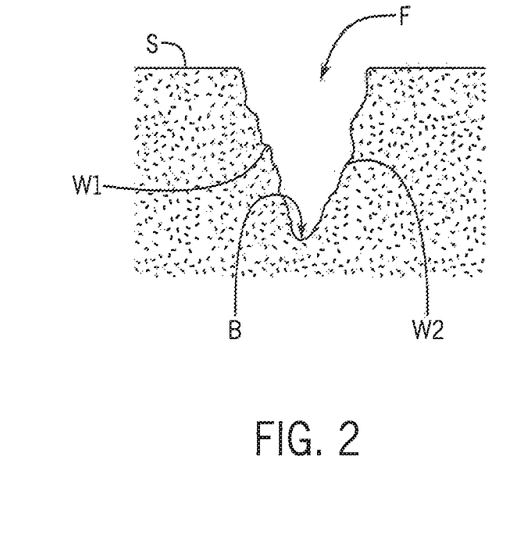
FIGS. 2 and 3 illustrate a furrow and a trench in the sidewall of the furrow formed by a single-pass, double-shoot planting unit of the seeding system of FIG. 1, in accordance with an exemplary embodiment of the present invention.
Figure 3:
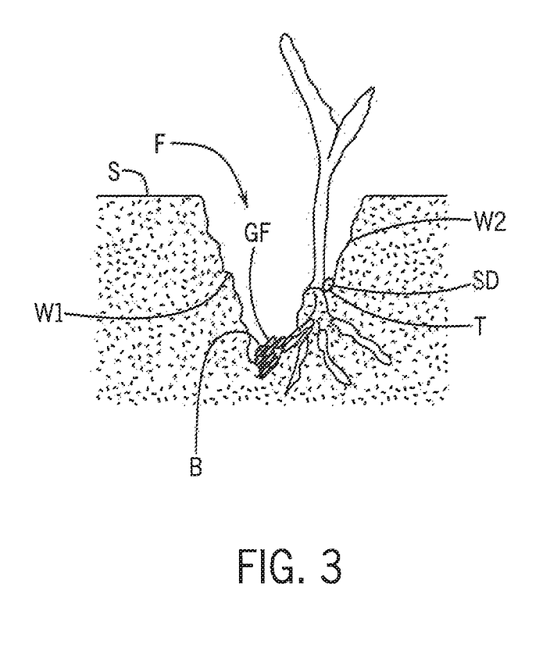

As shown in FIGS. 2 and 3, this is accomplished by the planting unit 20 first forming a furrow F in the surface S of the soil. The furrow F defines a bottom B and side walls W1 and W2 of the furrow F. The planting unit 20 then, in the same single-pass through the soil, forms a trench T in one of the side walls W2 of the furrow F. As further illustrated in FIG. 3, in the exemplary embodiment of the seeding system 10, a first agricultural product, in the form of a granular fertilizer GF, is deposited into the bottom B of the furrow F by the planting unit 20, and a second agricultural product, in the form of seed SD, is deposited into the trench T. The exemplary embodiment of the planting unit 20 is configured in such a manner that the trench T is located vertically above, and horizontally displaced from the bottom B of the furrow F, to thereby provide advantageous vertically and horizontally separated placement of the fertilizer GF and seed SD in the furrow F.

Figure 4:
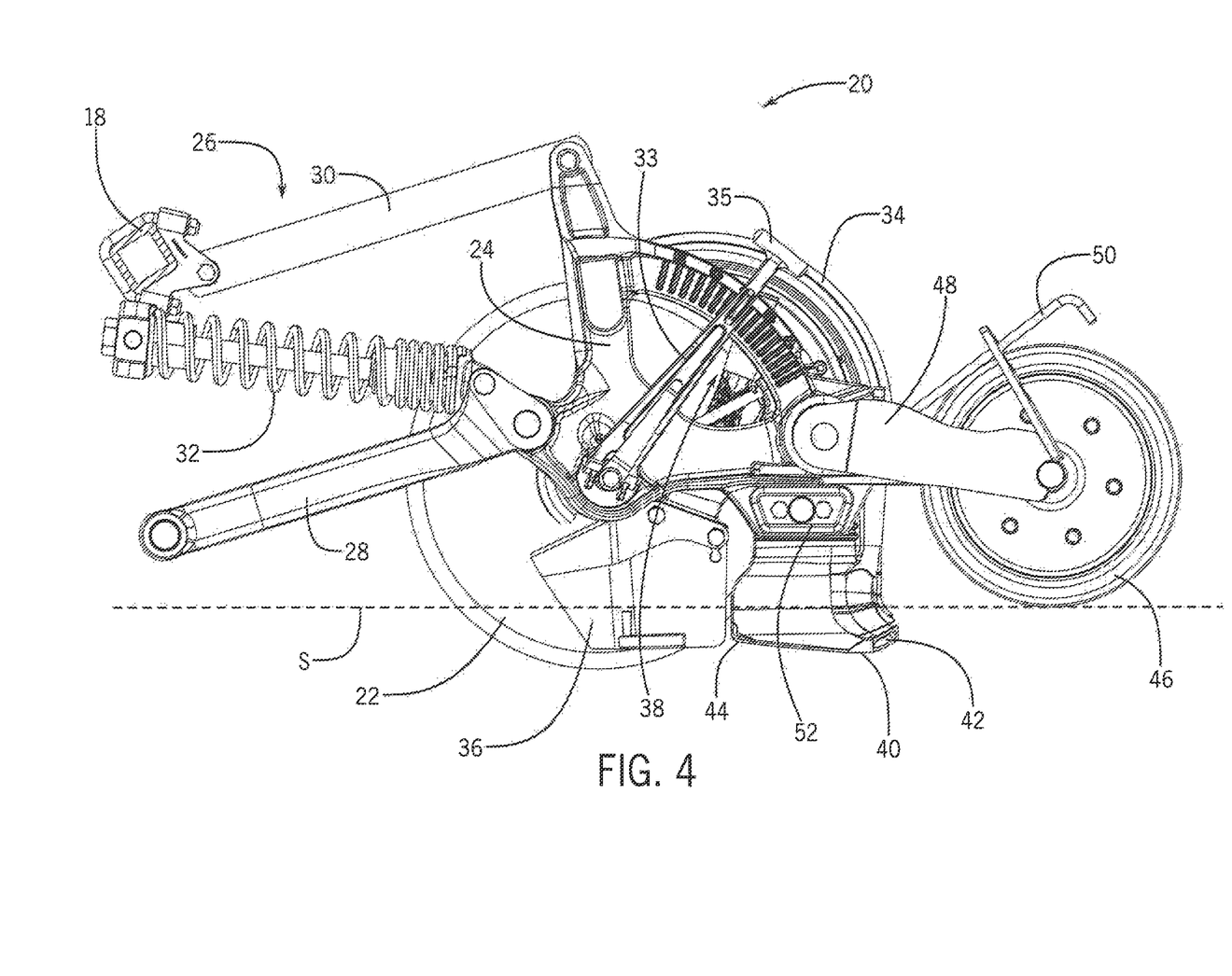
FIG. 4 illustrates a side elevation view of a planting unit of the planting system shown in FIG. 1, in accordance with an exemplary embodiment of the present invention.
Figure 5:
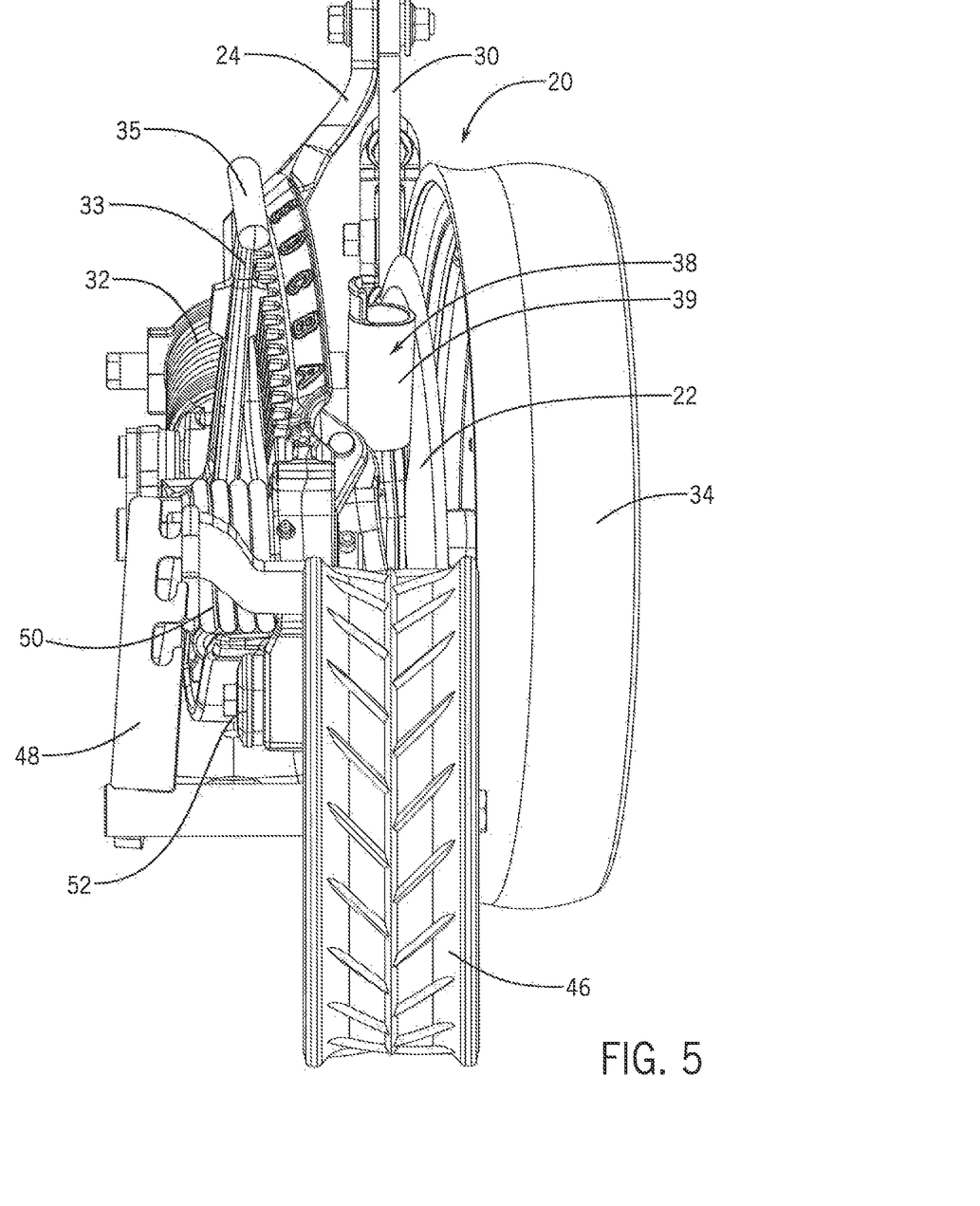
FIG. 5 illustrates a rear elevation view of the planting unit shown in FIG. 4, in accordance with an exemplary embodiment of the present invention.

As shown in FIGS. 4 and 5, each planting unit 20 includes a frame 24 that is operatively connected to the tool bar 18 by a parallel linkage arrangement 26 that includes links 28,30.

The planting unit 20 also includes a spring arrangement 32 that applies downward pressure through the parallel linkage arrangement 26 onto the frame 24 and the disk 22. Alternatively, a hydraulic or pneumatic cylinder, airbag, or other appropriate arrangement may be used to apply such downward pressure.

The disk 22 is angled from the direction of travel in such a manner that a leading face of the disk 22 displaces soil and creates a furrow in the soil as the disk 22 is pulled through the soil by the tractor 12. In one preferred embodiment, the vertical plane of the disk 22 is angled at an offset of approximately 7 degrees from the direction of travel, although different orientations, or orientations about more than one axis, are contemplated in other embodiments of the invention.

Depth of penetration of the disk 22 into the soil is controlled by a gauge wheel 34 that is positioned in relatively close proximity to the leading face of the disk 22 and configured to roll along the surface S of the soil. In addition to controlling the depth of penetration of the disk 22, the gauge wheel 34 also helps keep the adjacent leading face of the disk 22 clear of debris and controls soil throw. The gauge wheel 34 may be raised or lowered by rotation of a depth adjustment arm 33 using a handle 35 at the distal end of the arm 33.

A scraper blade 36 is provided on the opposite side of the disk 22 from the gauge wheel 34, to keep the trailing face of the disk 22 clear of soil, mud, and debris. In addition to providing a scraping function the scraper blade 36 also helps to hold the furrow open as particulate matter, e,g., seed and/or granular fertilizer, is deposited into the furrow.

The planting unit 20 includes a first product delivery arrangement 38 attached to the frame 24 adjacent the disk 22. The first product delivery arrangement has a first product tube 39 that is coupled in pneumatic communication, through a first pneumatic circuit, with the air cart 14. In a manner known in the art, seed and/or fertilizer is provided to the tube 39 which drops the seed and/or fertilizer into the furrow F. In the exemplary embodiment of the seeding system 10, the first product tube delivers granular fertilized GF to the bottom B of the furrow F in the manner described above with reference to FIGS. 2 and 3.

The planting unit 20 also includes a second product delivery arrangement 40 attached to the frame 24 aft of the disk 22. The second product delivery arrangement 40 is also attached to the frame 30 and coupled in pneumatic communication, through a second pneumatic product delivery circuit, with the air cart 14. The second product delivery arrangement 40 includes a second product tube 42 and a leading edge cutting member 44. The cutting member 44 is located adjacent the second product tube 42 and is configured for cutting the trench T in the second sidewall W2 of the furrow F as the planting unit 20 is pulled through the soil. This trench T is preferably offset both horizontally and, vertically from the bottom B of the furrow F cut by disk 22, in the manner described above with reference to FIGS. 2 and 3. The present invention thus provides single-pass deposition of both seed SD and fertilizer GE while simultaneously providing stratification between the two, in a manner that is known to result in improved crop yield. It will be understood however that the planting unit 20 could alternatively be used to deposit only one agricultural product (i.e. only seed, or only fertilizer) in a single pass. It will be further understood that the planting unit 20 could be utilized for depositing two varieties of seed, or two varieties of fertilizer in a single pass.

In one preferred embodiment, the cutting member 44 is angled upward toward its downstream end to lift the soil as the cutting member 44 is urged through the sidewall W2 of the furrow F. Thus, as the disk 22 and the cutting member 44 cut through the planting surface S, a portion of the soil in the second sidewall W2 is temporarily displaced from the furrow F and lifted to form the trench T. When disk 22 and cutting member 44 pass, the soil displaced by the upwardly angled cutting member 44 will tend to fail back onto itself and effectively fill-in the trench T and furrow F, thus securing seed SD in the seed trench T. Alternately, the cutting member 44 may be angled downward toward its downstream end to force the soil displaced in making the trench T down onto the fertilizer GF before the seed SD is deposited into the seed trench T.

A trailing packer wheel arrangement 46, coupled to the frame 24 by arm 48, packs soil in the furrow F after the seed SD and/or fertilizer GF are deposited by the planting unit 20. The amount of packing pressure applied by the trailing wheel 46 is controlled by a torsion spring 50, although it is contemplated that other types of biasing devices may be used in other embodiments of the invention, such as an extension spring, hydraulic or pneumatic cylinder, or an air bag, for example.

Figure 6:
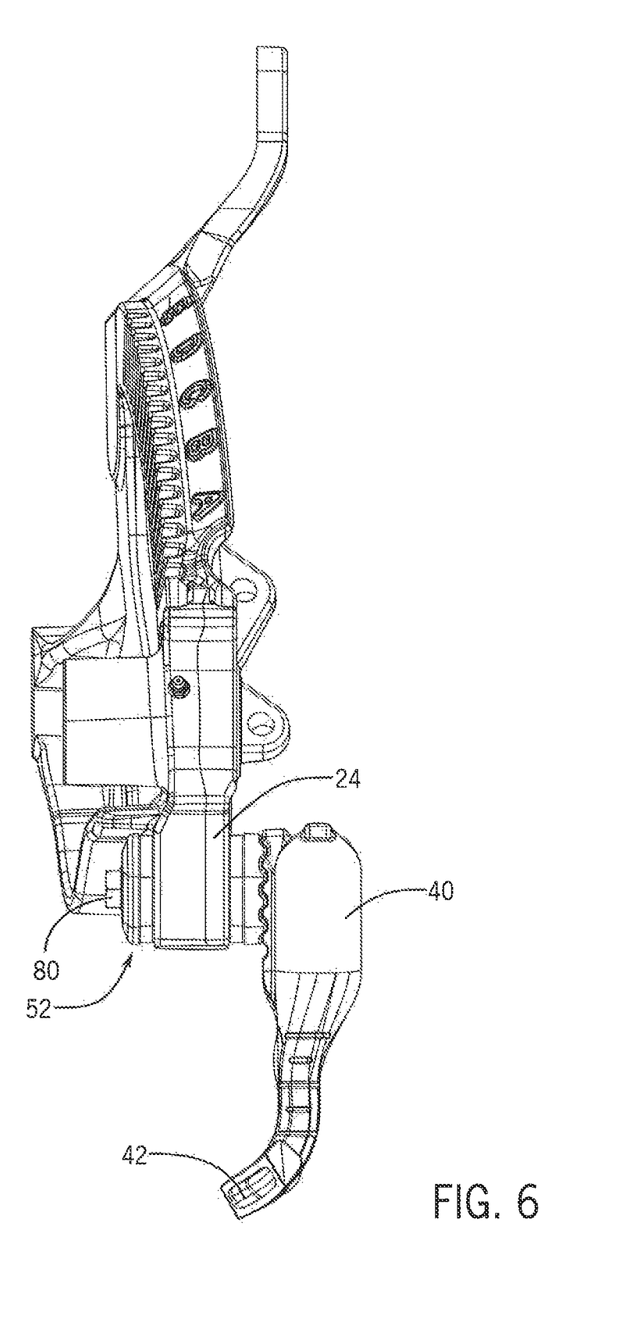
FIG. 6 illustrates a rear elevation view of the frame of a planting unit of the exemplary embodiment of FIG. 1, showing the resilient mounting arrangement joining the second product delivery unit to the frame, in accordance with an exemplary embodiment of the present invention.

As shown in FIGS. 4 and 6, the second product delivery arrangement 40 is resiliently and adjustably attached to the frame 24 by a resilient mounting arrangement 52, in the planting units 20 of the exemplary embodiment of the seeding system 10.

As will be understood from the description below, the resilient mounting arrangement 52 is operatively disposed between the frame 24 and the second product delivery arrangement 40 and configured to position the second product delivery arrangement 40 at an initial, neutral position of the second product delivery arrangement 40 relative to the frame 24 and the disk 22. The resilient mounting arrangement 52 is further configured for providing limited resilient movement of the second product delivery arrangement 40 from the neutral position under action of the soil on the second product delivery arrangement. This limited movement improves performance and life of the planting unit 20 and second product delivery unit 40 by allowing the second product delivery unit 40 to deflect from the neutral position, in the event that a rock or other obstruction is encountered by the second product delivery unit 40, and then be resiliently returned to the neutral position by action of the resilient mounting arrangement 52 once the obstruction has been passed.

Figure 7:
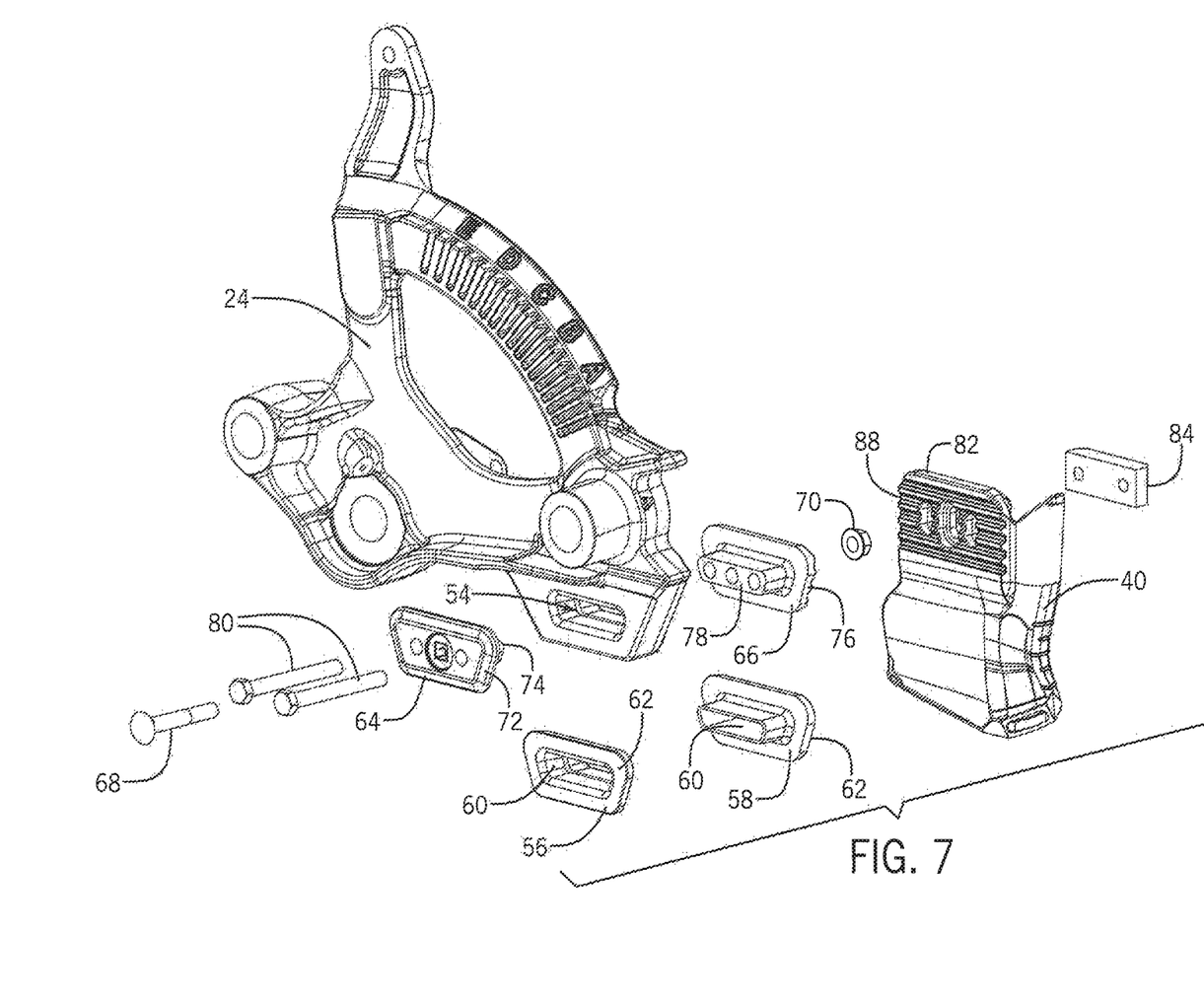
FIG. 7 illustrates a completely exploded perspective view of the components shown in FIG. 6, in accordance with an exemplary embodiment of the present invention.
Figure 8:
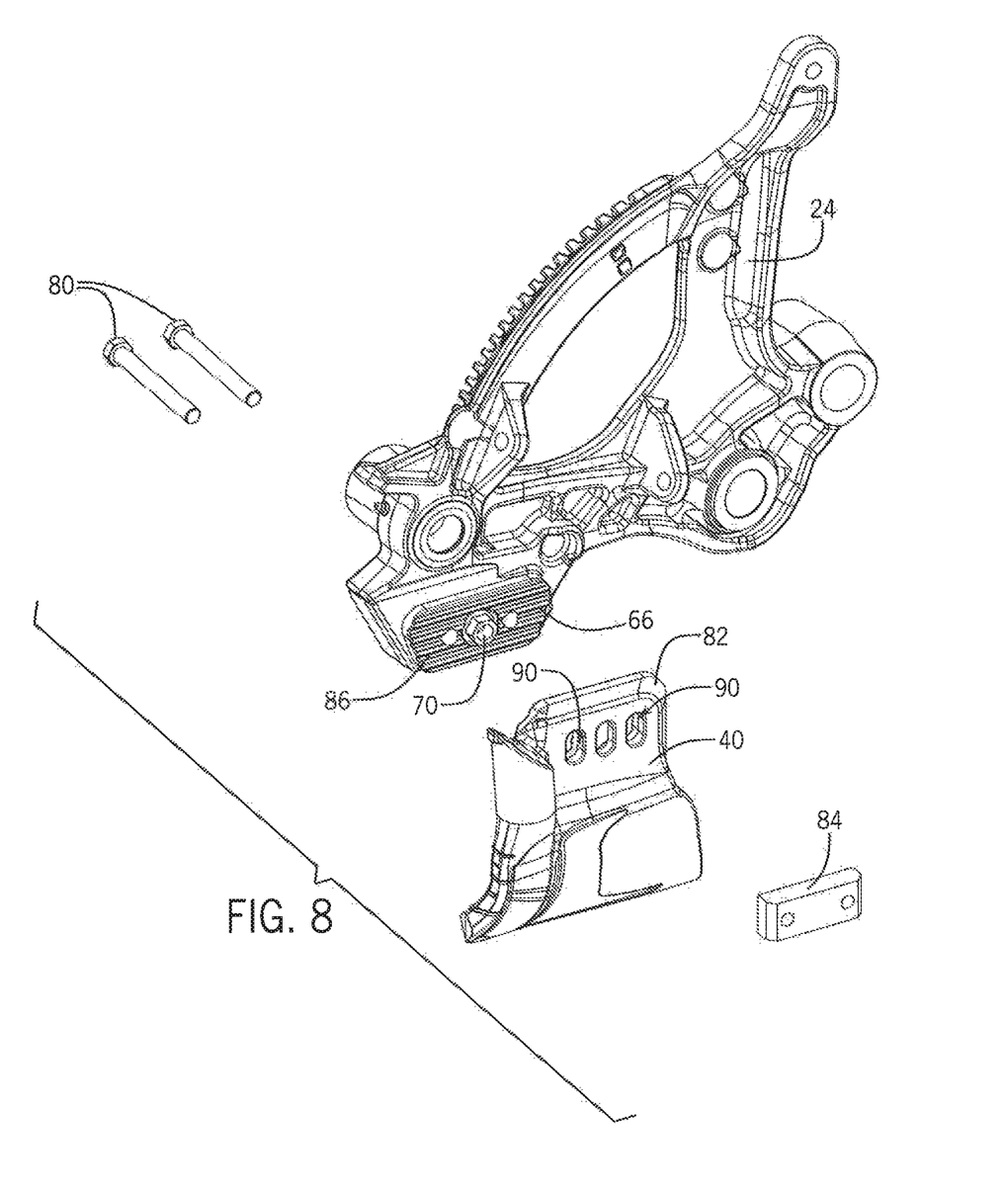
FIG. 8 illustrates a partially exploded perspective view of the components shown in FIG. 6, showing the resilient mounting arrangement installed into the frame, in accordance with an exemplary embodiment of the present invention.

FIGS. 7 and 8 illustrate the components and configuration of the resilient mounting arrangement 52 and the manner in which they interface with the frame 24 and second product delivery arrangement 40, in the exemplary embodiment of the seeding system 10.

The frame 24 defines an aperture 54 passing generally horizontally through the frame 24 from a first to a second side of the frame 24 and configured for receipt within the aperture 54 of a two-piece resilient element, including first and second resilient members 56,58. The first and second resilient members 56,58 of the exemplary embodiment are identical, but this need not be the case in other embodiments of the invention. Other embodiments of the invention may also utilize resilient elements having more or less than two members. Each of the resilient members 56,58 includes a tubular-shaped cuff 60, configured for extending into the aperture 54 from one of the first or second sides of the frame 24 from a gasket-like lip 62 that is configured for bearing against a respective side of the frame 24.

The resilient mounting members 56,58 are retained within the aperture 52 in the frame 24 by a clamping arrangement including first and second resilient mount clamping members 64,66, and a mount-clamping fastener arrangement in the form of a carriage bolt 68 and nut 70.

Figure 9:
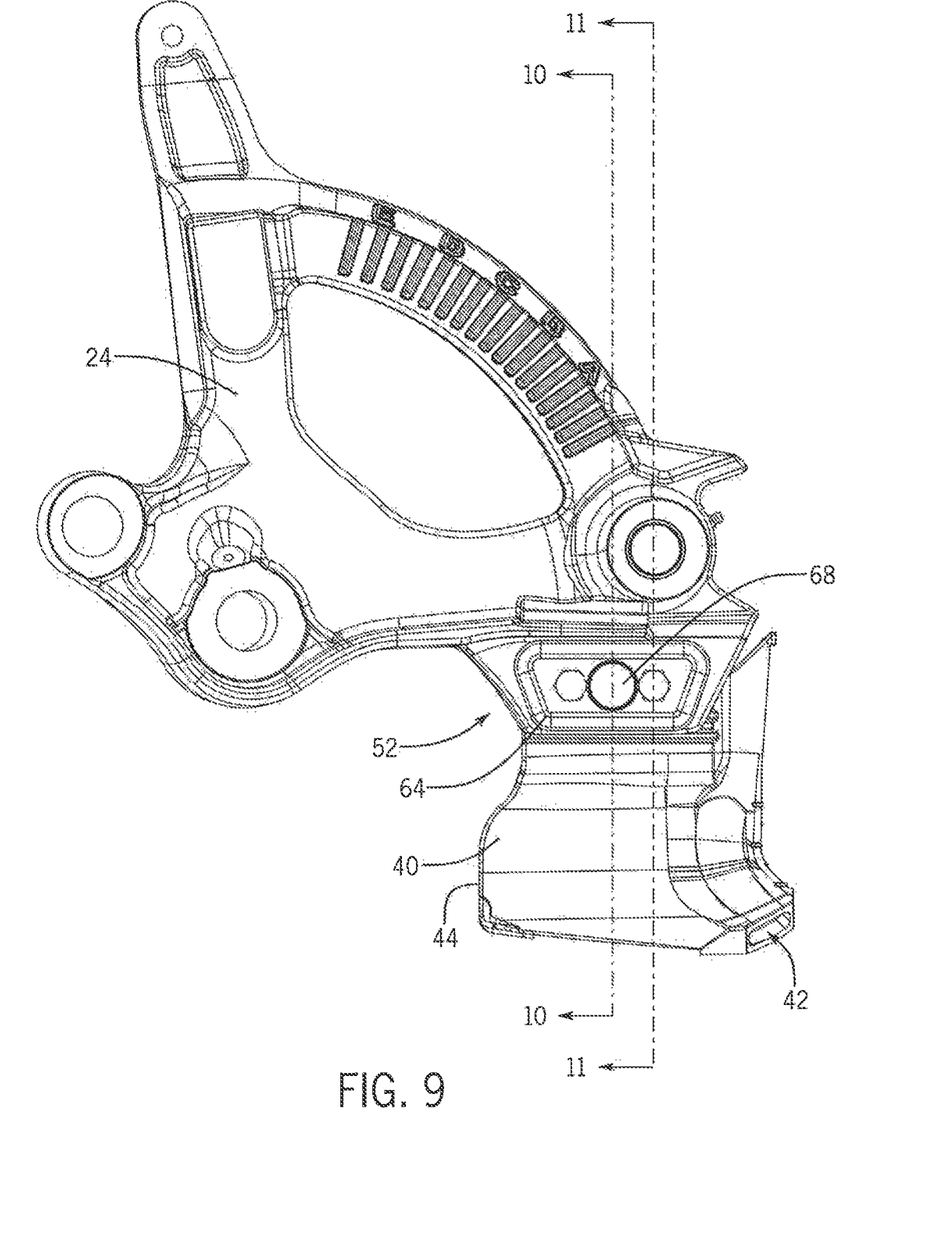
FIG. 9 illustrates a side elevation view of the components shown in FIG. 6, indicating cutting planes 10-0 and 11-1 for views shown in FIGS. 10 and 11, in accordance with an exemplary embodiment of the present invention.
Figure 10:
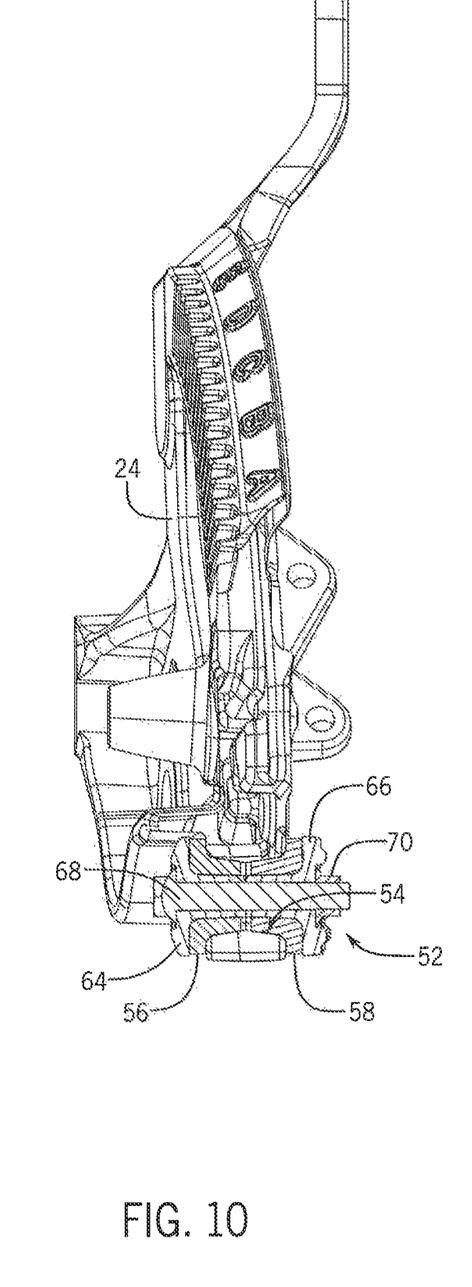
FIG. 10 illustrates a partial sectional view taken along line 10-10 as indicated in FIG. 9, in accordance with an exemplary embodiment of the present invention.

The first resilient mount clamping member 64 includes a respective clamping flange 72 configured to resiliently clamp the lip 62 of the first resilient member 56 against the first side of the frame 24, when the resilient mounting arrangement 52 is secured in the aperture 54 in the frame 24 by the carriage bolt 68 and nut 70, in the manner illustrated in FIGS. 8-10. As further indicated in FIGS. 7-11, the first resilient clamping member 64 includes a projection 74 extending generally perpendicular to the clamping flange 72 and configured to extend through the cuff 60 of the first resilient mounting member 56. The first clamping member 64 also defines a generally horizontally directed hole extending through the first clamping member 64 for passage of the carriage bolt 68 and having an integral recess for receiving the head of the carriage bolt 68 in a manner that precludes the carriage bolt 68 from rotating when it is seated in the recess of the first clamping member 64.

Similarly, the second resilient mount clamping member 66 includes a respective clamping flange 76 configured to resiliently clamp the lip 62 of the second resilient member 58 against the second side of the frame 24, when the resilient mounting arrangement 52 is secured in the aperture 54 in the frame 24 by the carriage bolt 68 and nut 70, in the manner illustrated in FIGS. 8-10. As further indicated in FIGS. 7-11, the second resilient clamping member 66 includes a projection 78 extending generally perpendicular to the clamping flange 76 and configured to extend through the cuff 60 of the second resilient mounting member 58. The second clamping member 66 also defines a generally horizontally directed hole extending through the second clamping member 66 for passage of the carriage bolt 68 and having an integral recess for receiving the nut 70 for securing the carriage bolt 68 and the resilient mounting arrangement 52 within the aperture 54 in the frame 24.

It will be appreciated that the above described elements of the resilient mounting arrangement 52 can be secured within the aperture 54 of the frame 24 independently from resiliently retaining the second product delivery arrangement 40 to the frame 24, in a manner that allows the advantageous results of being able to pre-install the above described elements of the resilient mounting arrangement 52 in the manner illustrated in FIGS. 8 and 1. It will be further appreciated that the above described configurations of the exemplary embodiment allow for removal or adjustment of the position of the second product delivery arrangement 40 without disturbing clamping of the resilient mounting arrangement 52 to the frame 24, as illustrated in FIG. 8 and described in more detail below.

As further shown in FIGS. 6-11, the first and second clamping members 64,66 of the clamping arrangement also each include a pair of aligned holes for passage through the resilient mounting arrangement 52 of a pair of second product delivery arrangement retaining bolts 80.

Figure 11:
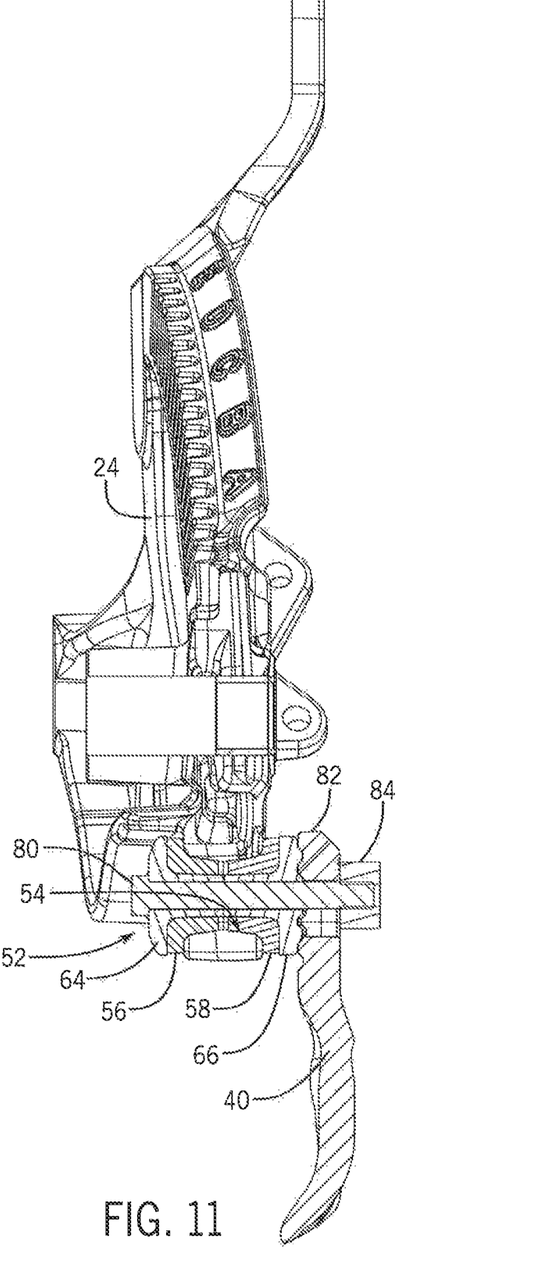
FIG. 11 illustrates a partial sectional view taken along line 11-11 as indicated in FIG. 9, in accordance with an exemplary embodiment of the present invention.

As best seen in FIG. 11, the pair of second product delivery arrangement retaining bolts 80 pass sequentially through the first resilient mount clamping member 64, the first and second resilient members 56,58, the second resilient mount clamping member 66, and a bolting flange 82 of the second product delivery arrangement 40, and then into threaded engagement with a threaded clamping block 84, for clamping and securing a bolting flange 82 of the second product delivery arrangement 40 against the second clamping member 66 to thereby secure the second product delivery arrangement 40 to the frame 24 in the neutral position of the second product delivery arrangement 40.

From the foregoing description, and an examination of FIG. 11, it will be appreciated that when the second product delivery arrangement 40 is clamped in place in the neutral position, it is completely isolated by the first and second resilient members 56,58 from having direct contact with the frame 24.

The term "neutral position," as used herein, refers to the position that the second product delivery arrangement 40 initially assumes at rest when it is fully resiliently supported by the first and second resilient members 56,58 in the manner described above. In operation, as the second product delivery unit 40 is moved through the soil as part of the planting unit 20, forces imposed on the second product delivery unit 40 by the soil, crop debris, rocks or other obstructions may cause the first and second resilient members 56,58 to flex, and thereby allow limited movement of the second product delivery unit 40 about its neutral position. The elastic properties of the first and second resilient members 56,58 continually act to resiliently urge the second product delivery unit 40 back toward its neutral position.

As shown in FIGS. 7 and 8, in the exemplary embodiment of the planting unit 20, mating faces 86,88 of the second resilient mount clamping member 66 and the clamping flange 82 include a series of cooperatively configured grooves that can be interlocked at several different vertical positions to allow vertical adjustment of the neutral position of the second product delivery arrangement 40 with respect to the frame 24 and the disk 22. As further illustrated in FIG. 8, holes 90,90 extending through the clamping flange 82 of the second product delivery arrangement 40, for passage of the second product delivery arrangement retaining bolts 80, are configured as vertically extending slots to accommodate clamping of the second product delivery arrangement 40 in any of the several different vertically spaced, neutral positions afforded by the interlocking grooved faces 86,88 of the second resilient mount clamping member 66 and the clamping flange 82 of the second product delivery arrangement 40.

It will be appreciated that having the second product delivery arrangement 40 attached in this manner allows for adjustment of vertical stratification between the first and second agricultural products in the furrow F, to thereby accommodate different seed/fertilizer, seed/seed or fertilizer/fertilizer combinations, for example. It will also be appreciated the having the second product delivery arrangement mounted to be vertically adjustable in the manner described above allows for adjustment to compensate for wear on the disk 22 and the cutting member 44.

From the foregoing description, and an examination of the drawings, those having skill in the art will appreciate that the exemplary embodiments described herein also provide additional advantages beyond those already mentioned above. By resiliently mounting the second product delivery arrangement to the frame 24, the stress and strain imposed on the mounting bolts 80 during operation of the planting unit 20 are reduced in a manner that allows for fewer and smaller sized fasteners to be used for the mounting bolts 80, thereby reducing cost and complexity, and facilitating operation and maintenance.

In the exemplary embodiments, the same sized bolts are used for mounting both the second product delivery arrangement 40 and the scraper 36 to the frame 24. Since both the second product delivery arrangement 40 and the scraper 36 are adjustable vertically relative to the frame 24 and disc 22, having all of the mounting bolts for these structures be the same size considerably facilitates operation and maintenance of the planting unit 20. Furthermore, the exemplary embodiment of the planning unit 20 is configured such that all of the bolts used for mounting the second product delivery arrangement 40 and the scraper 36 are accessible from the same side of the planting unit 20 and are removable without having to apply a wrench on the opposite side of the planting unit 20.

Additionally, by locating the head of the carriage bolt 68 on the same side of the planting unit 20 as the heads of the mounting bolts 80 for the second product delivery arrangement 40, and the nut 70 securing the carriage bolt 68 on the opposite side of the planting unit 20, inadvertent and unnecessary disassembly of the resilient mounting arrangement 52 is precluded when the second product delivery arrangement 40 is removed or has its vertical neutral position is adjusted.

Those having skill in the art will recognize that, although the invention has been described above with respect to an exemplary embodiment of a dispensing apparatus that includes a first product delivery arrangement 38 delivering fertilizer and a second product delivery arrangement 40 delivering seed, in other embodiments of the invention the first product delivery arrangement 38 could alternatively be used to deposit either fertilizer or seed, and likewise that the second product delivery arrangement 40 could be alternatively be used to deposit either seed or fertilizer.

Many changes and modifications could be made to the invention without departing from the spirit thereof. The scope of these changes will become apparent from the appended claims.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein but is intended to include all changes and modifications that are within the scope and spirit of the invention.

What is claimed is:

1. A planting unit for delivering a first and a second agricultural product using an agricultural implement, the planting unit comprising:
   a frame adapted for attachment to the agricultural implement and defining mutually perpendicular vertical and horizontal reference planes of the planting unit;
   a disk arrangement rotatably connected to the frame and configured for cutting a furrow into soil, the furrow defining a bottom and a sidewall of the furrow;
   a first product delivery arrangement attached to the frame adjacent the disk arrangement and configured for delivery of the first agricultural product to the furrow; and
   a second product delivery arrangement including a cutting member configured for cutting a trench into the sidewall of the furrow above the bottom of the furrow;
   the second product delivery arrangement being configured for delivery of the second agricultural product to the trench in the sidewall of the furrow;
   the second product delivery arrangement being resiliently attached to the frame at a neutral position of the first product delivery arrangement relative to the frame and the disk arrangement by a resilient mounting arrangement operatively disposed between the frame and the second product delivery arrangement and configured to provide limited resilient movement of the second product delivery arrangement from the neutral position under action of the soil on the second product delivery arrangement.

2. The planting unit of claim 1, wherein the trench is cut horizontally and vertically offset from the bottom of the furrow.

3. The planting unit of claim 1, wherein the second product delivery arrangement is operatively connected to the frame by an adjustable mounting arrangement having at least two user selectable positions for adjusting the neutral position of the second product delivery arrangement with respect to the disk arrangement.

4. The planting unit of claim 1, wherein the frame includes a receptacle for receiving a portion of the resilient mounting arrangement.

5. The planting unit of claim 4, wherein the resilient mounting arrangement includes a resilient element disposed at least partly in the receptacle in the frame, and a clamping arrangement for resiliently clamping the resilient element between the second product delivery arrangement and the frame.

6. The planting unit of claim 5, wherein the clamping arrangement and the second product delivery arrangement are configured for vertically adjusting the neutral position of the tubular member and the cutting member of the second product delivery arrangement with respect to the disk arrangement.

7. The planting unit of claim 6, wherein:
   the frame defines an aperture extending generally horizontally into the frame, and configured for receiving the resilient element;
   the resilient element is configured for being retained within the aperture by the clamping arrangement; and
   the clamping arrangement includes at least one fastener passing through the resilient element and providing clamping engagement of the resilient element between the frame and the second product delivery arrangement.

8. The planting unit of claim 7, wherein:
   the aperture for receiving the resilient element extends generally horizontally through the frame from a first to a second side of the frame;
   the resilient element includes a first resilient member configured for extending into the aperture from the first side of the frame and having a lip configured for bearing against the first side of the frame;
   the resilient element also includes a second resilient member configured for extending into the aperture from the second side of the frame and having a lip configured for bearing against the second side of the frame;
   the clamping arrangement includes first and second resilient mount clamping members and a resilient mount clamping fastener, with the first and second resilient mount clamping members being configured for respectively operatively engaging the lips of the first and second resilient members, and the mount clamping fastener, resilient members and mount clamping members being configured for passage of the mount clamping fastener through the resilient members and mount clamping members and for providing clamping engagement of the resilient members within the aperture in the frame by the mount clamping members; and
   the clamping arrangement further including at least one second product delivery arrangement fastener configured for passing through the resilient members and mount clamping members for clamping and securing the second product delivery arrangement in the neutral position against one of the clamping members.

9. The planting unit of claim 8, wherein the one of the clamping members and the second product delivery arrangement are cooperatively configured such that the neutral position of the second product delivery arrangement is operatively connected to the frame in a manner providing at least two user selectable positions for vertically adjusting the neutral position of the tubular member and the cutting member of the second product delivery arrangement with respect to the disk arrangement.

10. An agricultural implement including at least one planting unit for delivering a first and a second agricultural product using the agricultural implement, the at least one planting unit comprising:
a frame adapted for attachment to the agricultural implement and defining mutually perpendicular vertical and horizontal reference planes of the at least one planting unit;
a disk arrangement rotatably connected to the frame and configured for cutting a furrow into soil, the furrow defining a bottom and a sidewall of the furrow;
a first product delivery arrangement attached to the frame adjacent the disk arrangement and configured for delivery of the first agricultural product to the furrow; and
a second product delivery arrangement including a cutting member configured for cutting a trench into the sidewall of the furrow above the bottom of the furrow;
the second product delivery arrangement being configured for delivery of the second agricultural product to the trench in the sidewall of the furrow;
the second product delivery arrangement being resiliently attached to the frame at a neutral position of the first product delivery arrangement relative to the frame and the disk arrangement by a resilient mounting arrangement operatively disposed between the frame and the second product delivery arrangement and configured for providing limited resilient movement of the second product delivery arrangement from the neutral position under action of the soil on the second product delivery arrangement.

11. The agricultural implement of claim 10, wherein the second product delivery arrangement of the at least one planting unit is operatively connected to the frame by an adjustable mounting arrangement having at least two user selectable positions for adjusting the neutral position the second product delivery arrangement with respect to the disk arrangement.

12. The agricultural implement of claim 11, wherein the frame of the product delivery apparatus includes a receptacle for receiving a portion of the resilient mounting arrangement.

13. The agricultural implement of claim 12, wherein the resilient mounting arrangement of the product delivery apparatus includes a resilient element disposed at least partly in the receptacle in the frame, and a clamping arrangement for resiliently clamping the resilient element between the second product delivery arrangement and the frame.

14. The agricultural implement of claim 13, wherein the clamping arrangement and the second product delivery arrangement of the product delivery apparatus are configured for vertically adjusting the neutral position of the tubular member and the cutting member of the second product delivery arrangement with respect to the disk.

15. The agricultural implement of claim 14, wherein:
the frame of the product delivery apparatus defines an aperture extending generally horizontally into the frame, and configured for receiving the resilient element;
the resilient element of the product delivery apparatus is configured for being retained within the aperture by the clamping arrangement; and
the clamping arrangement of the product delivery apparatus includes at least one fastener passing through the resilient element and providing clamping engagement of the resilient element between the frame and the second product delivery arrangement.

16. The agricultural implement of claim 15, wherein:
the aperture for receiving the resilient element extends generally horizontally through the frame from a first to a second side of the frame;
the resilient element includes a first resilient member configured for extending into the aperture from the first side of the frame and having a lip configured for bearing against the first side of the frame;
the resilient element also includes a second resilient member configured for extending into the aperture from the second side of the frame and having a lip configured for bearing against the second side of the frame;
the clamping arrangement includes first and second resilient mount clamping members and a resilient mount clamping fastener, with the first and second resilient mount clamping members being configured for respectively operatively engaging the lips of the first and second resilient members, and the mount clamping fastener, resilient members and mount clamping members being configured for passage of the mount clamping fastener through the resilient members and mount clamping members and for providing clamping engagement of the resilient members within the aperture in the frame by the mount clamping members; and
the clamping arrangement further including at least one second product delivery arrangement fastener configured for passing through the resilient members and mount clamping members for clamping and securing the second product delivery arrangement in the neutral position against one of the clamping members.

17. The agricultural implement of claim 16, wherein the one of the clamping members and the second product delivery arrangement are cooperatively configured such that the neutral position of the second product delivery arrangement is operatively connected to the frame in a manner providing at least two user selectable positions for vertically adjusting the neutral position of the tubular member and the cutting member of the second product delivery arrangement with respect to the disk arrangement.

18. A method for constructing a planting unit for delivering a first and a second agricultural product using an agricultural implement, where the planting unit includes a frame adapted for attachment to the agricultural implement and defining mutually perpendicular vertical and horizontal planes of the planting unit, a disk arrangement rotatably attached to the frame for cutting a furrow into soil in such a manner that the furrow defines a bottom and a sidewall of the furrow, a first product delivery arrangement attached to the frame adjacent the disk arrangement, with the first product delivery arrangement being configured for delivery of the first agricultural product to the furrow, and a second product delivery arrangement attached to the frame, with the second product delivery arrangement including a cutting member configured for cutting a trench into the sidewall of the furrow above the bottom of the furrow, the second product delivery arrangement being configured for delivery of the second agricultural product to the trench in the sidewall of the furrow, the method comprising:

resiliently attaching the second product delivery arrangement to the frame at a neutral position of the first product delivery arrangement relative to the frame and the disk arrangement with a resilient mounting arrangement operatively disposed between the frame and the second product delivery arrangement and configured for providing limited resilient movement of the second product delivery arrangement from the neutral position under action of the soil on the second product delivery arrangement.

19. The method of claim 18, further comprising, operatively connecting the second product delivery arrangement to the frame by an adjustable resilient mounting arrangement having at least two user selectable positions for adjusting the neutral position of the second product delivery arrangement with respect to the disk arrangement.

20. The method of claim 18, further comprising operatively attaching the second product delivery arrangement to the frame with a resilient mounting arrangement that includes a clamping arrangement configured for retaining the resilient mounting arrangement in attachment with the frame independently from resiliently retaining the second product delivery arrangement to the frame.

\* \* \* \* \*